Jan. 22, 1935.   R. E. NEWELL   1,988,957
DIAPHRAGM VALVE
Filed Jan. 31, 1931   3 Sheets-Sheet 1

INVENTOR
Robert E. Newell
by
Byrnes, Stebbins, Parmelee & Blenko
his Attorneys

Jan. 22, 1935.  R. E. NEWELL  1,988,957
DIAPHRAGM VALVE
Filed Jan. 31, 1931  3 Sheets-Sheet 2

INVENTOR
Robert E. Newell
by Byrnes, Stebbing,
Parmelee & Blenko
his attorneys

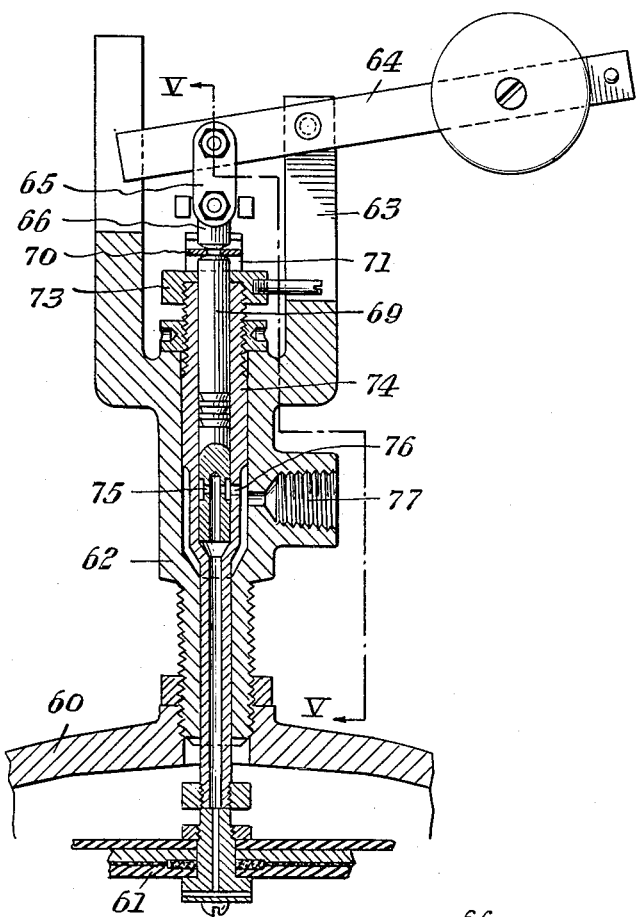
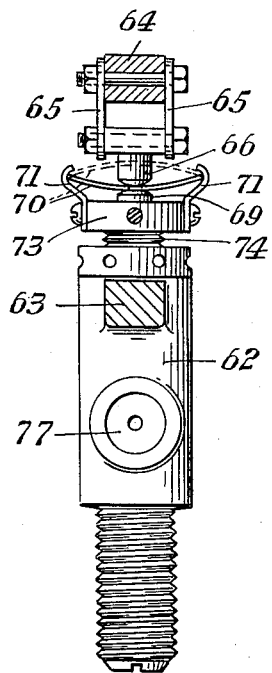
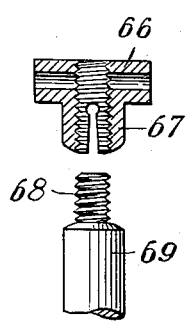

Patented Jan. 22, 1935

1,988,957

UNITED STATES PATENT OFFICE 1,988,957

DIAPHRAGM VALVE

Robert E. Newell, Irwin, Pa., assignor to Robertshaw Thermostat Company, Youngwood, Pa., a corporation of Pennsylvania Application January 31, 1931, Serial No. 512,640

14 Claims. (Cl. 137—139)

The present invention relates broadly to the art of fluid control, and more particularly to control systems including diaphragm valves, and to means making it possible to obtain a throttling action by the use of such valves.

Diaphragm valves as heretofore utilized have been generally of two broad classes. These may be characterized as the gradually operating diaphragms or the snap action diaphragms. In either case, however, the diaphragm valves have been of such construction that they have normally occupied either a completely open or a completely closed position. This has necessarily limited their use to installations in which it was practicable to operate either with a full fuel flow or with a minimum fuel flow, depending upon the setting of the diaphragm.

In accordance with the present invention there is provided a diaphragm valve of such construction that it may function normally as a throttling valve with all of the advantages therefore both of a diaphragm valve and of the usual throttling valve structure.

In the acompanying drawings I have shown for purposes of illustration only, certain preferred embodiments of the invention. In the drawings:

Figure 4 is a view partly in vertical section and partly in elevation of a modified embodiment of the invention;

Figure 5 is a sectional view along the line V—V of Figure 4, looking in the direction of the arrows; and Figure 6 is a detail view partly in section and partly in elevation, illustrating part of the structure of Figures 4 and 5.

Figure 1:
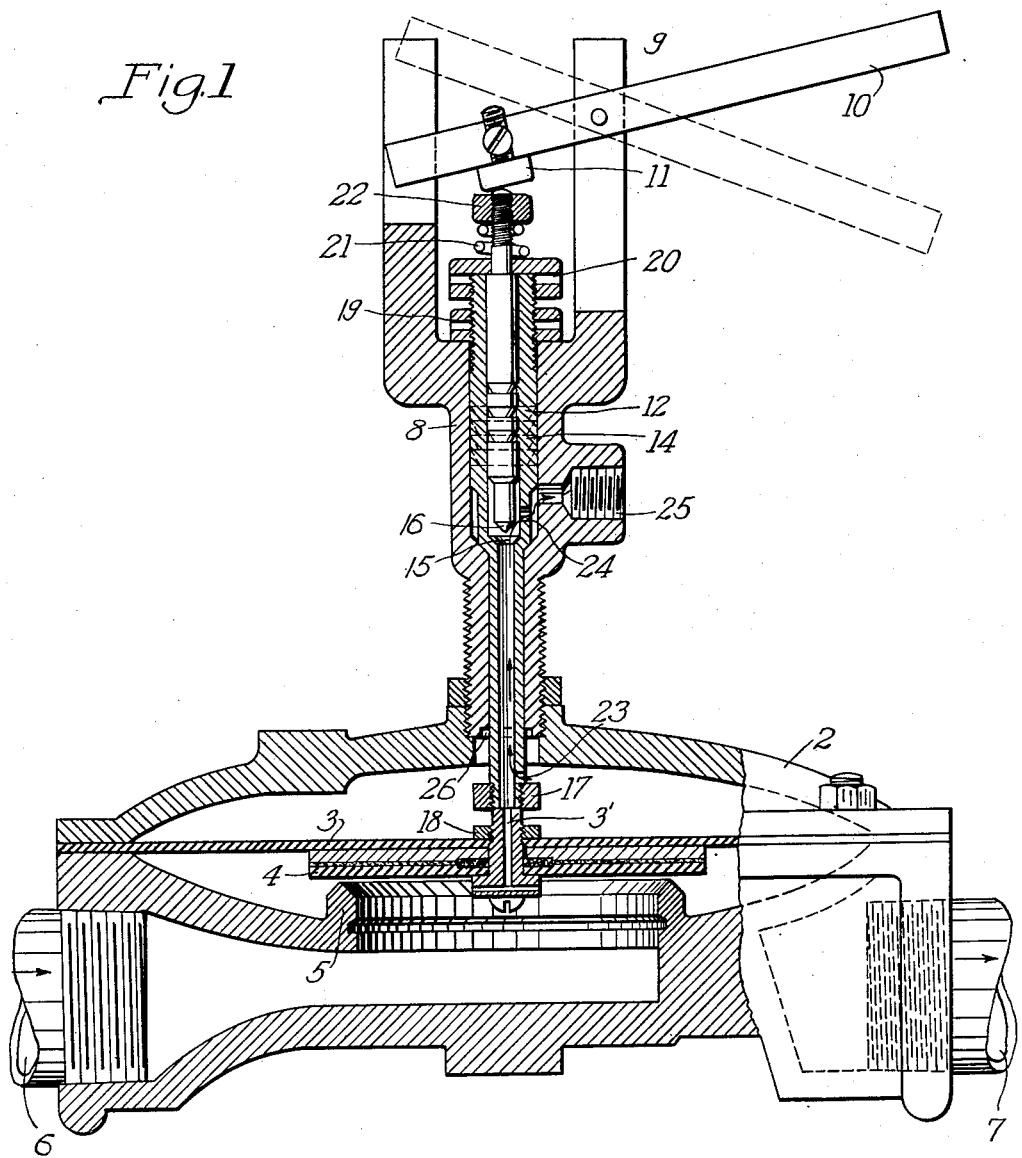
Figure 1 is a vertical sectional view through one type of valve constructed in accordance with the present invention.

For purposes of illustrating the present invention, I have illustrated a diaphragm valve structure including a diaphragm casing 2 having a diaphragm 3 therein provided with a valve portion 4 adapted to cooperate with a seat 5 and control by its position the passage of a fuel from the inlet 6 to the outlet 7. The valve is herein illustrated as being of the type provided with a central orifice 3' extending completely through the diaphragm. Such structures are well understood in the art.

Threaded into the valve casing 2 and projecting upwardly therefrom is a throttling attachment and safety device including a housing 8 shaped at its upper end to provide a bearing 9 for a lever 10. This lever is of the type adapted to be connected with the operating arm of a suitable control device such as a thermostat (not shown) which controls, for example, the boiler or furnace temperature. The connection with the lever 10 will be of such nature as to cause gradual movement thereof in a counter-clockwise direction as viewed in Figure 1 in case of any increase in temperature, and gradual movement thereof in a clockwise direction as viewed in Figure 1 for any temperature decrease.

Carried by the opposite end of the lever from that connected to the control referred to, is an adjustable abutment or screw 11 adapted to cooperate with the upper end of a valve pin 12. This valve pin is positioned within a sleeve 14 provided intermediate its ends with a seat 15 adapted to cooperate with the valve portion 16 of the valve stem 12. The lower end of the sleeve 14 is provided with an enlarged head 17 adapted to cooperate with the screw 18 extending through the diaphragm 3 and containing the bleed orifice 3'. The upper end of the sleeve 14 is threaded to receive a stop nut 19 by means of which the downward movement of the sleeve 14 may be positively controlled. By threading the nut 19 in one direction or the other, the extent of downward movement of the sleeve 14 may be varied at will. Secured to the sleeve above the nut 19 is a second nut 20 having an upper surface adapted to cooperate with one end of a compression spring 21, the opposite end of which cooperates with a nut 22 on the valve pin 12.

The sleeve 14 at its lower end above the head 17 is formed with an orifice 23 communicating with the interior of the sleeve and adapted to permit a gas flow from the chamber above the diaphragm 3 in the direction indicated by the arrows, upwardly past the seat 15 and by way of orifice 24 to an outlet connection 25 which may lead to a bleed pilot or the like. As is customarily the case, the bleed pilot outlet 25 may be controlled by a suitable valve operated in accordance with room temperature, safety pilots, low water cut-offs and the like.

The lower end of the housing 8 has a cut away or recessed portion 26 adapted to register with the opening 23 when the sleeve is in its uppermost position for reasons which will hereinafter be more fully understood.

It may be assumed by way of example that the temperature conditions being controlled are below the temperature range desired. In that case the lever 10 will occupy a position somewhat as indicated in chain lines in Figure 1. At this time the entire stem assembly 14 will be in its upper position with the opening 23 within the recess 26. In this position, the head 17 on the lower end of the sleeve will be so located as to permit the diaphragm to move upwardly away from the seat 5 to permit a free flow of fuel from the inlet 6 to the outlet 7. During this time some portion of the fuel will pass through the orifice 3' into the chamber above the diaphragm. Such fuel may pass by way of the orifice 23 into the interior of the sleeve 14 and thence by way of the central orifice 24 into the bleed outlet 25.

If all of the conditions are proper for normal operation, such fuel will be permitted to flow freely from the connection 25. Should, however, abnormal conditions occur, such, for example, as a dangerously low water level, flow through the outlet 25 will be cut off, as understood in the art, thereby causing the fuel which bleeds through the orifice 3' to accumulate above the diaphragm and gradually build up a pressure. At such time as this pressure approximates the pressure of the fuel below the diaphragm, it will be effective, together with the weight of the diaphragm, for moving the diaphragm downwardly to bring the valve 4 against the seat 5 and prevent further fuel flow.

Should the conditions remain normal, however, the fuel so bled through the orifice 3' will continue to escape through the outlet 25 and the diaphragm valve will remain open until such time as the temperature exceeds the temperature desired. At that time the lever 10 will be swung in a counter-clockwise direction with a gradual movement in accordance with the temperature increase. This movement will be effective for gradually lowering the sleeve 14 and, through the head 17, for gradually moving the diaphragm valve toward its seat whereby the flow of the fuel will be throttled. This condition will continue until such time as the stop nut 19 engages the housing 8, thereby limiting further downward movement of the sleeve and consequently further closing movement of the diaphragm valve through the medium thereof.

In Figure 1 of the drawings I have illustrated the nut 19 as being so adjusted as to permit the valve 4 to remain a slight distance from its seat with the sleeve 14 in its down position. The space thus provided between the valve and its seat will be sufficient to permit the desired minimum quantity of fuel to flow for permissible burner operation. Should, however, the temperature continue to rise above the desired range, the continued movement of the lever 10 will be sufficient for overcoming the resistance of the spring 21 and for compressing this spring to thereby effect a downward movement of the valve pin 12 within the sleeve to such an extent as required to bring the valve portion 16 thereof into engagement with the seat 15. This will prevent further escape of the fuel which is constantly being bled through the diaphragm and cause such fuel to accumulate in a quantity sufficient to produce complete closure of the diaphragm valve.

It will thus be apparent that I have provided an attachment for diaphragm valves of such nature that during all normal conditions of operation a throttling movement of the diaphragm valve is obtained in accordance with temperature variations. Such throttling attachment, however, includes a safety feature effective under abnormal conditions for effecting a pressure accumulation within the diaphragm casing to an extent sufficient to effect a closing movement of the diaphragm valve.

Figure 2:
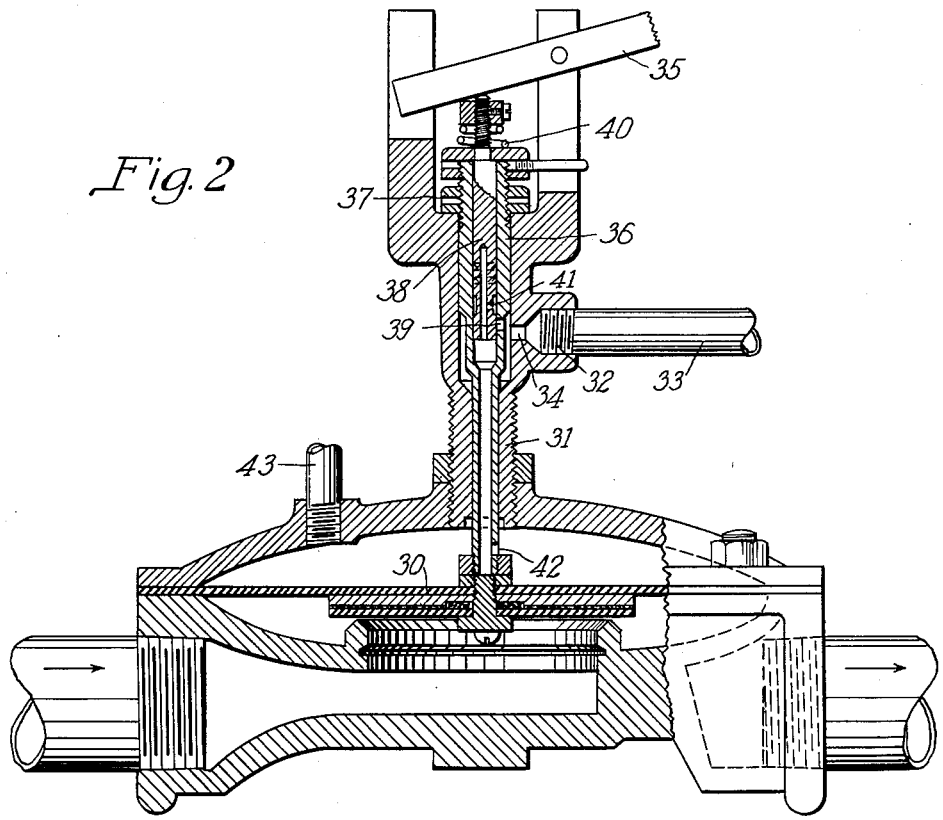
Figure 2 is a view similar to Figure 1 illustrating another type of valve embodying the present invention.

In Figure 2 there is illustrated another embodiment of the invention just described, and differing principally therefrom in that the diaphragm 30 is not provided with a bleed orifice therethrough. In this embodiment the housing 31 is formed with a connection 32 adapted to receive a fuel line 33 effective for delivering fuel to a port 34. In Figure 2 the parts of the attachment are illustrated in the position which they occupy when the desired maximum temperature conditions have been attained. At this time the lever 35 controlled in the manner before described has moved the sleeve assembly 36 downwardly to the limit permitted by the stop nut 37. At this time the valve pin 38, the lower end of which constitutes a sleeve valve, is in such position as to close the central orifice 39 and prevent the passage of fuel from the line 33 into the interior of the sleeve 36.

The diaphragm valve 30, therefore, remains in slightly spaced relation to its seat to an extent determined by the setting of the nut 37. Should the temperature continue to rise, however, the lever 35 will continue its movement in a counter-clockwise direction, thereby compressing spring 40 and moving valve pin 38 downwardly within the sleeve 36. Upon a predetermined downward movement a port 41 in the sleeve valve portion of the valve pin will come into registration with the central orifice 39 and permit the flow of fuel from the connection 33 through port 34, central orifice 39 and port 41 to the interior of the sleeve 36, and thence by way of a bottom orifice 42 into the chamber above the diaphragm. This fluid so supplied will be in sufficient quantity and under such pressure as to effect a downward complete closing movement of the diaphragm valve, thereby cutting off further fuel flow through the valve.

The fuel so supplied to the diaphragm casing is permitted to gradually escape through a suitable connection 43 to a pilot or the like by means of which it is gradually consumed.

So long as an abnormal temperature condition continues, the diaphragm valve will remain closed. Should the temperature drop, however, the lever 35 will gradually rotate in a clockwise direction, thereby moving the port 41 out of registration with the central orifice 39 to prevent the further delivery of fuel to the casing above the diaphragm. The fuel which had previously accumulated therein will pass out through the connection 43, and the diaphragm 30 will be permitted to resume the position illustrated in Figure 2. Should the temperature continue to drop, the clockwise movement of the lever 35 will continue, thereby gradually moving the sleeve 36 upwardly and permitting the fuel pressure below the valve to effect a corresponding opening movement of such valve.

To those skilled in the art it will be apparent that the construction of Figure 2 embodies all of the advantages described in connection with Figure 1, the structure incorporating only those differences necessary to effect operation of a type of valve in which provision for bleeding fuel therethrough is not present.

Figure 3:
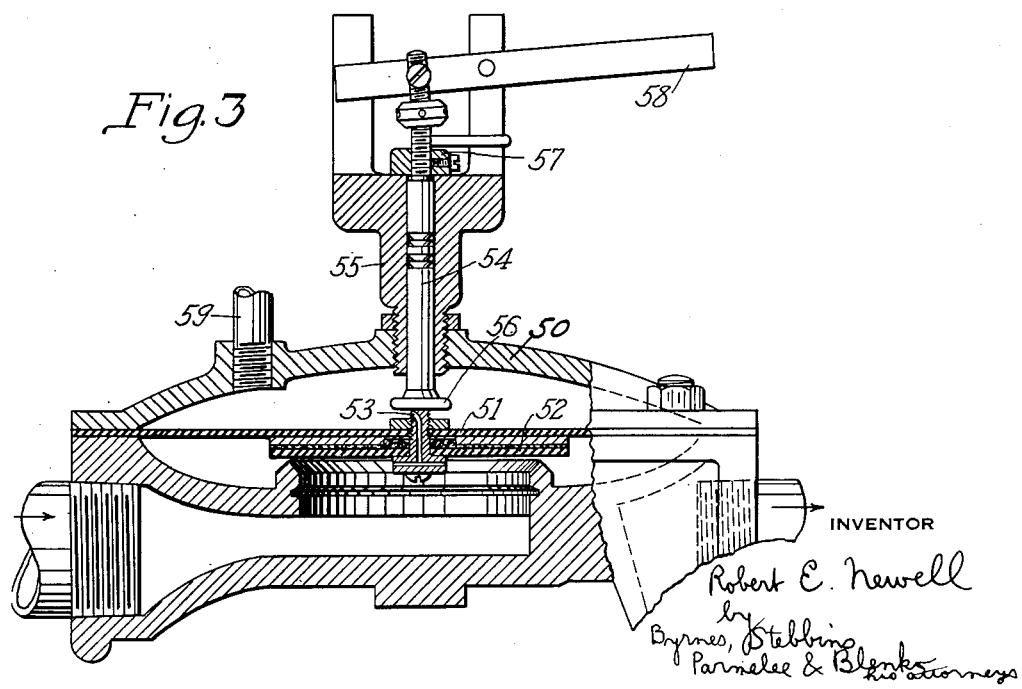
Figure 3 is a view illustrating a throttling type valve without the safety features of the valves of Figures 1 and 2.

In Figure 3 there is illustrated a modified embodiment of my invention characterized by a throttling attachment without provision for safety operation in case of excessive temperature conditions. In this embodiment of the invention there is shown a diaphragm casing 50 having a diaphragm 51 therein carrying a valve 52 and provided with a bleed orifice 53 through the diaphragm. A diaphragm operating stem 54 extends through a housing 55 carried by the diaphragm casing, and functions in a manner similarly to the sleeves 14 and 36 illustrated and described in connection with Figures 1 and 2 respectively. This stem at its lower end has a head 56 adapted to cooperate with the screw through which the bleed orifice 53 is formed, and at its upper end carries a stop nut 57. The stem is adapted to be actuated by means of a lever 58 corresponding to the levers 10 and 35.

In case of increase in temperature conditions being controlled, movement of the lever 58 in a counter-clockwise direction will serve to depress the stem 54 to the limit permitted by the nut 57, this movement being effective through the head 56 for gradually moving the valve 52 toward its seat. In this way the stem is moved responsively to variations in temperature conditions, and in turn effects a movement of the diaphragm valve corresponding thereto, thus throttling the fuel flow in accordance with temperature conditions.

Pressure accumulating in the casing above the diaphragm by reason of the bleed orifice 53, may be dissipated through a suitable bleed line 59 leading to a burner or the like. By controlling this line through the medium of a thermostat safety pilot low water cut-off or the like (not shown), the dissipation of accumulated pressure may be prevented and the diaphragm valve accordingly forced onto its seat at such times as abnormal conditions exist.

In many cases it is desirable to provide a construction such that after the maximum temperature has been reached and the safety device has been operated to close the diaphragm entirely, the succeeding opening movement of the diaphragm will be to its full extent rather than only a partial opening as will characterize constructions of the type illustrated and described in Figures 1 to 3 of the drawings. This is particularly true in artificial gas districts, for example, on some types of burners which are likely to backfire after the gas has been shut off and then turned on again in small volume only.

In Figures 4 to 6 of the drawings there is illustrated a modified embodiment of the invention whereby such an objectionable operation is prevented. In Figure 4 of the drawings there is illustrated a valve and operating means therefor comprising a diaphragm casing 60 having a diaphragm valve 61 carried thereby. Threaded into the casing 60 is a housing 62 shaped at its upper end to provide a bearing 63 for a control lever 64 of the type heretofore described. This control lever is illustrated as being pivotally connected through the medium of links 65 to a nut 66, illustrated in detail in Figure 6. This nut has a slit extension 67 internally threaded to cooperate with and receive the upper threaded end 68 of a throttling pin 69. It is to be noted that the lower end of the sleeve 67 and the upper end of the throttling pin 69 at the base of the threaded portion 68 are both of generally convex contour to provide a seat for cooperation with a click spring 70.

This click spring is provided with a central opening adapted to fit over the threaded extension 68 so as to be confined between the convex surfaces referred to. At its outer ends, the click spring is carried by clips 71 shaped to confine the ends of the click spring, and in turn secured to a valve stem retaining nut 73 threaded onto the upper end of a sleeve or push rod 74. This sleeve or push rod functions in the manner before described for directly operating the diaphragm in accordance with movements of the lever 64.

In Figure 4 the parts are shown in such position that a port 75 in the pin 69 is in registration with a port 76 in the stem or push rod 74, these two ports being in communication with a pressure connection 77 similar, for example, to that illustrated in Figure 2. With the parts in this position, assuming the pressure connection 77 to be open to the interior of the valve casing, the diaphragm valve will be positively held shut.

With the parts in the position just described, it may be assumed that the temperature condition being controlled, gradually drops and that the lever 64 gradually swings in a clockwise direction. The click spring 70 before described may be adjusted so as to have, for example, approximately a two pound tension before snapping to the opposite curvature as indicated in dotted lines in Figure 5. This being true, the movement of the lever 64 just described will be effective for bodily raising both the rod or sleeve 74 and the pin 69 while maintaining the same relationship between the ports 75 and 76. When the stem 74 has reached the upper limit of its movement, further movement of the lever 64 will tend to gradually store up energy in the spring 70, this storing up operation continuing until the spring suddenly snaps to its opposite curvature as indicated in dotted lines in Figure 5. At this time, the valve operating sleeve 74 being in its complete upper position, there is nothing to restrict complete opening movement of the diaphragm, the throttling pin 69 snapping upwardly to move the ports 75 and 76 out of engagement and thereby cut off the supply of pressure fluid through the connection 77.

The construction just described therefore is effective for permitting the positive operating means for the diaphragm to move completely out of holding relationship thereto before the throttling pin changes its position with relation to such stem.

As the temperature gradually builds up, the lever 64 will swing in the opposite direction, gradually moving both the pin 69 and the sleeve 74 downwardly until the sleeve has reached its lowermost position. Thereupon the storing up of energy in the spring 70 will cause it to snap into the position illustrated in Figure 4.

Exactly the same type of structure is applicable to a diaphragm valve of the type illustrated for example in Figure 1. In such case, however, the port 75 will be located relatively closer the lower end of the pin 69 so that with the pin 69 in its lowermost position as illustrated in Figure 4, the escape of pressure bled through the diaphragm into the casing thereabove will be prevented. The same structure therefore, changed only with respect to port location in one of the parts is equally adaptable either to a diaphragm valve of the type having a bleed opening therethrough as illustrated in Figure 1, or of the type illustrated in Figure 2 in which the pressure is supplied from an outside source.

In either case, likewise, the structure is useful in connection with a room thermostat, for example, which controls the flow in one direction or the other through the connection corresponding to the connection 77. Such a room thermostat tends to lag behind the operation of the lever 64, for example. Thus the lever 64 may operate to position the parts before the room thermostat operates. In such case, however, the advantages of a snap action or full opening movement are still obtained since the parts must necessarily assume a complete open position before the diaphragm can rise, whether it be controlled directly by the throttling pin with the connection 77 open, or whether it be controlled by an auxiliary regulator in the connection 77.

In all of the forms of the invention there is provided means for obtaining a throttling type movement of a diaphragm valve by successive increments whereby the fluid flow may be made directly proportional to temperature conditions and varied in accordance with variations in such conditions.

The invention also adapts itself to the inclusion of safety features by means of which a complete closing movement of the diaphragm valve may be effected in case of abnormal or undesirable conditions.

While I have herein illustrated and described certain preferred embodiments of the present invention, it will be understood that changes in the construction and operation of the parts herein described may be made without departing either from the spirit of the invention or the scope of my broader claims.

I claim:

1. The combination with a diaphragm valve including a casing for said valve, of an attachment carried by said casing and effective for varying the valve position by successive increments in accordance with the conditions being controlled, a limit stop for said attachment and means for supplying fluid pressure to one surface of said diaphragm for closing the valve after the limit stop has been engaged by said attachment.

2. The combination with a valve casing having a diaphragm valve therein, of a throttling attachment carried by said casing, said attachment including operating means for changing the position of said valve by successive increments, a stop for the operating means to limit the closing of the diaphragm valve, and other means for effecting a safety closing of said valve after the operating means has been stopped.

3. The combination with a valve casing having a diaphragm valve therein, of a throttling attachment carried by said casing, said attachment including operating means for changing the position of said valve by successive increments, means for limiting the maximum closing movement of said valve under the influence of the means of said attachment, and other means for completely closing said valve.

4. The combination with a casing having a diaphragm valve therein, of a throttling attachment secured to said casing and including a housing, a hollow stem movable within said housing, control means connected to said stem and effective against said valve for controlling the position thereof, a stop for the hollow stem to limit the closing of the valve, and a safety valve movable within and relatively to said stem arranged to be moved after the stem has engaged the stop.

5. The combination with a diaphragm valve, of plunger means cooperating therewith and effective for maintaining a valve position varying in one direction a stop for the plunger means to limit the closing of the diaphragm valve, a safety valve cooperating with said plunger means and arranged to be actuated after the plunger means has been stopped, and means for imparting a snap action to said safety valve.

6. The combination with a diaphragm valve, of movable means cooperating with said valve for moving it toward its closed position, a stop for said movable means, safety means cooperating with said movable means to move the valve to its closed position after the movable means has been stopped, and means for imparting a snap movement to said safety means.

7. The combination with a diaphragm valve, of a valve operating sleeve, means for moving said sleeve to move the valve toward its closed position, a stop for the sleeve, a safety valve cooperating with said sleeve to move the valve to its closed position after the sleeve has been stopped, and means for imparting snap movements to said safety valve.

8. The combination with a diaphragm valve including a diaphragm and valve carried thereby, of actuating means movably cooperating therewith and effective for producing gradual closing movements of said valve, a stop for the actuating means to limit the closing of the valve, other means for supplying an actuating fluid to one surface of the diaphragm valve to close the valve after the movable means has been stopped, and means for imparting a snap movement to said other means.

9. The combination with a casing having a diaphragm valve therein, of a throttling attachment secured to said casing and including a housing, a hollow stem movable within said housing and effective against said valve for controlling the position thereof, a stop for the stem to limit the closing of the valve, a safety valve movable relatively to said stem to effect the closing of the valve after the stem has been stopped, and means for insuring a snap movement of said safety valve.

10. The combination with a diaphragm valve of mechanism for producing gradual closing movement of said valve, means including an auxiliary valve for varying the fluid pressure on the diaphragm valve to shift the same, and means necessitating a return movement of said closing mechanism prior to movement of said auxiliary valve to cause opening of said diaphragm valve.

11. A fluid flow control device comprising a casing, there being a fluid inlet to said casing and a fluid outlet therefrom, a diaphragm valve for controlling the flow of fluid from the inlet to the outlet, means for controlling the opening and closing movement of the valve, a stop for said means to limit the closing of the valve, other means for closing the valve after the first means has engaged the stop, and means for imparting a snap action to said last mentioned means.

12. The combination of a valve casing and a diaphragm valve therein, a valve seat for said valve surrounding a fluid inlet to said casing, there being a fluid outlet from said casing, control means associated with said valve for controlling the position of the valve relative to its seat from its fully open position to a predetermined partially closed position to control the continuous flow of fluid through the casing in accordance with the requirement for fluid under normal conditions, a stop for said control means, and a safety means for moving said valve to its seat to shut off the flow of fluid through the casing under abnormal conditions after the control means has engaged said stop.

13. The combination with a diaphragm valve, of plunger means cooperating therewith and effective for maintaining a valve position varying in accordance with the conditions being controlled, a limit stop for said plunger means, and a safety valve within and cooperating with said plunger means for permitting pressure to be built up on one side of the diaphragm valve to close the same after the limit stop has become operative to prevent further movement of the plunger.

14. The combination with a diaphragm valve, of plunger means cooperating therewith and effective for maintaining a valve position varying in accordance with the conditions being controlled, a limit stop for said plunger means, and a safety valve within and cooperating with said plunger means for controlling the pressure on one side of the diaphragm valve to close the same after said limit stop has become operative to prevent further movement of the plunger.

ROBERT E. NEWELL.